(12) United States Patent
Iwamoto et al.

(10) Patent No.: US 9,908,497 B2
(45) Date of Patent: Mar. 6, 2018

(54) CAB SUPPORT STRUCTURE OF CONSTRUCTION MACHINE

(71) Applicant: Caterpillar SARL, Geneva (CH)

(72) Inventors: Takahiro Iwamoto, Tokyo (JP); Takuya Yamamoto, Tokyo (JP); Ryo Iguchi, Tokyo (JP); Akito Nakai, Tokyo (JP); Takeshi Tsuneyoshi, Tokyo (JP); Takeshi Nakamura, Tokyo (JP)

(73) Assignee: Caterpillar SARL, Geneva (CH)

( * ) Notice: Subject to any disclaimer, the term of this patent is extended or adjusted under 35 U.S.C. 154(b) by 129 days.

(21) Appl. No.: 15/029,074

(22) PCT Filed: Oct. 28, 2014

(86) PCT No.: PCT/EP2014/073076
§ 371 (c)(1),
(2) Date: Apr. 13, 2016

(87) PCT Pub. No.: WO2015/063060
PCT Pub. Date: May 7, 2015

(65) Prior Publication Data
US 2016/0229367 A1   Aug. 11, 2016

(30) Foreign Application Priority Data
Oct. 29, 2013   (JP) ................................ 2013-224186

(51) Int. Cl.
*B60R 21/13* (2006.01)
*B62D 33/06* (2006.01)
(Continued)

(52) U.S. Cl.
CPC .............. *B60R 21/13* (2013.01); *A01B 76/00* (2013.01); *B62D 33/0604* (2013.01); *E02F 9/0816* (2013.01); *E02F 9/163* (2013.01)

(58) Field of Classification Search
CPC .... A01B 76/00; B60R 21/13; B62D 33/0604; E02F 9/0816; E02F 9/163
See application file for complete search history.

(56) References Cited

U.S. PATENT DOCUMENTS 3,177,032 A * 4/1965 Jaskowiak ........... B60G 99/004
                                                    296/35.1
7,364,223 B2 * 4/2008 Mori .................. B62D 33/0604
                                                    180/89.13
(Continued)

FOREIGN PATENT DOCUMENTS

EP         2453063 A2      5/2012
JP     2003191812 A  *    7/2003    ............. B60R 21/11
(Continued)

OTHER PUBLICATIONS

European Patent Office, International Search Report in International Patent Application No. PCT/EP2014/073076, Jan. 23, 2015, 2 pp.

*Primary Examiner* — Glenn Dayoan
*Assistant Examiner* — Paul Chenevert

(57) ABSTRACT

This invention relates to a cab support structure for construction machine. The cab support structure has a rear beam and a front beam, which support front and rear part of cab, and a center beam located and welded between inner and outer frames of the machine. A stopper located at the corner of center beam side of the junction of rear beam and outer frame is formed box shape. The stopper has an L-shaped plate welded to the rear beam and the outer frame, and a doubling L-shaped plate welded to the L-shaped plate, rear beam, and outer frame.

5 Claims, 4 Drawing Sheets

(51) Int. Cl.
*E02F 9/08* (2006.01)
*E02F 9/16* (2006.01)
*A01B 76/00* (2006.01)

(56) References Cited

U.S. PATENT DOCUMENTS

| | | | | |
|---|---|---|---|---|
| 7,445,272 | B2 * | 11/2008 | Lee | E02F 9/121 |
| | | | | 180/89.12 |
| 7,665,801 | B2 * | 2/2010 | Lee | E02F 9/08 |
| | | | | 296/187.03 |
| 7,722,008 | B2 * | 5/2010 | Yoon | B62D 33/0604 |
| | | | | 180/89.12 |
| 7,828,371 | B2 * | 11/2010 | Murakami | B62D 33/0604 |
| | | | | 296/190.03 |
| 8,128,155 | B2 * | 3/2012 | Ansorge | B60R 21/13 |
| | | | | 296/190.03 |
| 8,240,745 | B2 * | 8/2012 | Yamamoto | B62D 33/0604 |
| | | | | 296/187.13 |
| 8,517,457 | B2 * | 8/2013 | Yamamoto | B62D 33/0604 |
| | | | | 296/190.07 |
| 8,567,850 | B2 * | 10/2013 | Honda | E02F 9/0816 |
| | | | | 180/89.13 |
| 8,590,668 | B2 * | 11/2013 | Masuda | B62D 33/06 |
| | | | | 181/200 |
| 8,678,120 | B2 * | 3/2014 | Shimomura | E02F 9/0808 |
| | | | | 172/776 |
| 9,016,657 | B2 * | 4/2015 | Fang | E02F 9/163 |
| | | | | 248/638 |
| 9,333,992 | B2 * | 5/2016 | Kinoshita | B62D 33/0617 |
| 9,745,717 | B2 * | 8/2017 | Sakata | E02F 9/0808 |
| 2004/0245806 | A1 | 12/2004 | Mori | |
| 2006/0071499 | A1 * | 4/2006 | Yoon | B62D 33/0604 |
| | | | | 296/35.1 |
| 2011/0135434 | A1 | 6/2011 | Yoon | |
| 2017/0009425 | A1 * | 1/2017 | Tajima | B62D 33/0604 |

FOREIGN PATENT DOCUMENTS

| | | | | |
|---|---|---|---|---|
| JP | 2005023718 A | * | 1/2005 | E02F 9/163 |
| JP | 2007-182698 A | | 7/2007 | |
| JP | 2007-196712 A | | 8/2007 | |
| JP | 2010-042761 A | | 2/2010 | |
| JP | 2010-048026 A | | 3/2010 | |
| JP | 2012-082595 A | | 4/2012 | |

* cited by examiner

CAB SUPPORT STRUCTURE OF CONSTRUCTION MACHINE

CROSS-REFERENCE TO RELATED APPLICATIONS

This application is a national phase application of International Patent Application No. PCT/EP2014/073076, filed Oct. 28, 2014, which claims priority to Japanese Patent Application No. 2013-224186, tiled Oct. 29, 2013, both of which are incorporated by reference herein in their entireties for all purposes.

TECHNICAL FIELD

The present invention relates to stopper units of a machine body frame that serve as fitting units of a roll-over restriction device that restricts displacement of a cab in a direction away from the machine body frame at the time of roll over of a machine body and the like, in a cab support structure of a construction machine that supports the cab on the machine body frame via anti-vibration mounts.

BACKGROUND ART

In a cab for a construction machine such as a hydraulic shovel as a representative example, for example, front and rear parts of a bottom part are supported on beams of a machine body frame via a plurality of anti-vibration mounts (see Japanese Patent Application Laid-open No. 2012-82595 (JP '595), for example).

When the cab has a roll-over protective structure (ROPS), the cab includes a roll-over restriction device that is provided between the cab and the machine body frame to protect an operator in the cab by restricting deformation of the cab, by restricting displacement of the machine body frame at the time of roll over of the machine body and the like.

A representative example of the roll-over restriction device (see JP '595, for example) is configured such that stopper bolts are joined from sides of beams of the machine body frame which are fitted with the anti-vibration mounts, to the bottom part of the cab. A gap is provided between the head part of the other ends of the stopper bolts and the stopper units provided on the beams. Displacement of the cab from the machine body frame is restricted by this gap.

DISCLOSURE OF THE INVENTION

A conventional cab support structure of a construction machine as described above has the following problems to be solved.

On the beams that support the cab, there are formed fitting holes of relatively large diameters for the anti-vibration mounts, and the stopper units that have small diameter holes for the stopper bolts and stopper-bolt contacting parts, near the large-diameter fitting holes. In the stopper units, a large load occurs when the stopper bolts of the roll-over restriction device are in contact with the stopper units at the time of roll over of the machine body and the like. Therefore, in order to suppress local deformation, the beams themselves and the stopper units need to be reinforced to improve strength.

Therefore, according to the conventional cab support structure, structures of beams that support the cab are complex, and a welding process of the beams including sub-assemblies is complex. Welding parts are many, welding distortion is large, and the weight of the cab support structure becomes large. Further, a using quantity of high-strength materials at high unit cost becomes large.

Further, when the cab that is supported on the machine body frame is not a roll-over protective structure (ROPS) cab, the roll-over restriction device is not necessary. However, stopper units are prepared for the beams to commonize the parts. Otherwise, in order to provide a structure that does not include stopper units, commonization of the parts is difficult in many cases.

Therefore, the beams of the machine body frame that support the cab and the stopper units provided on the beams increase the cost of the cab support structure.

The present invention has been made in view of the above facts. A technical subject of the invention is to provide a cab support structure of a construction machine, capable of setting stopper units of a machine body frame for fitting beams which support a cab via anti-vibration mounts and a roll-over restriction device of the cab, in simple structures, facilitating welding, with minimum welding distortion, in small weight, capable of minimizing a quantity of high-strength and high unit-cost materials, and further capable of setting stopper units only when the cab has a roll-over protective structure (ROPS) and reducing manufacturing cost.

According to the present invention, as a cab support structure of a construction machine that solves conventional problems, there is provided a cab support structure of a construction machine. The cab support structure includes: a front beam and a rear beam that are respectively joined and arranged between an inner frame and an outer frame which extend in a front and rear direction of a machine body frame, and that support a front and a rear of a cab via anti-vibration mounts, and a center beam which is positioned between the front beam and the rear beam; and stopper units of restriction members which are joined to the cab to restrict movement of the cab at the time of roll over of a machine body, the stopper units being joined to the rear beam and the outer frame respectively at corner parts where the rear beam and the outer frame are in contact with each other, and being formed in a box structure.

Preferably, each stopper unit includes: an L-shaped plate which is obtained by forming a band-shaped plate into an L shape, with one side thereof being set as a vertical side directed downward, and the other side being set as an upper side directed to the outer frame, an edge part on one side of each of the vertical and upper sides being joined to the rear beam, and a front end part of the upper side being positioned on the outer frame side, at the corner part; and a doubling plate that reinforces the L-shaped plate and is obtained by forming a band-shaped plate into an L shape, with one side thereof being set as an upper side which is superposed on the upper side of the L-shaped plate in an orthogonal direction and is joined to the L-shaped plate, the rear beam, and the outer frame respectively, and with the other side being set as a vertical side directed downward, an edge part on one side of the vertical side being joined to the outer frame.

Further, a lower end of each stopper unit is joined to a bottom frame which is joined to lower parts of the rear beam and the outer frame, of the machine body frame.

In the present invention, directions of "front and rear, left and right, and up and down" means "the front and rear direction, the left and right direction, and the up and down direction" based on the cab that is supported on the machine body frame (indicated by arrows in the attached FIG. 1).

The cab support structure of a construction machine that is configured according to the present invention includes: a front beam and a rear beam that are arranged between an inner frame and an outer frame of a machine body frame, and that support a front and a rear of a cab via anti-vibration mounts, and a center beam which is positioned between the front beam and the rear beam; and stopper units that restrict movement of the cab at the time of roll over of a machine body, the stopper units being formed in a box structure by being joined to the rear beam and the outer frame respectively, at corner parts where the rear beam and the outer frame are in contact with each other.

The stopper units that restrict movement of the cab are provided in a box structure in which the stopper units are joined not to the rear beam which supports the cab via the anti-vibration mounts but to the corner parts at which the rear beam and the outer frame are in contact with each other. Therefore, the rear beam and the stopper units can be formed in simple structures, can be welded easily with minimum welding distortion, and can be made lightweight. Moreover, the quantity of high-strength and high unit-cost materials used can be reduced. Further, because the stopper units can be set only when the cab has a roll-over protective structure (ROPS), manufacturing cost can be reduced.

BEST MODE FOR CARRYING OUT THE INVENTION

Hereinafter, a cab support structure of a construction machine configured according to the present invention will be described in further detail with reference to the attached drawings that show a preferred embodiment of a hydraulic shovel as a representative construction machine.

Figure 5:
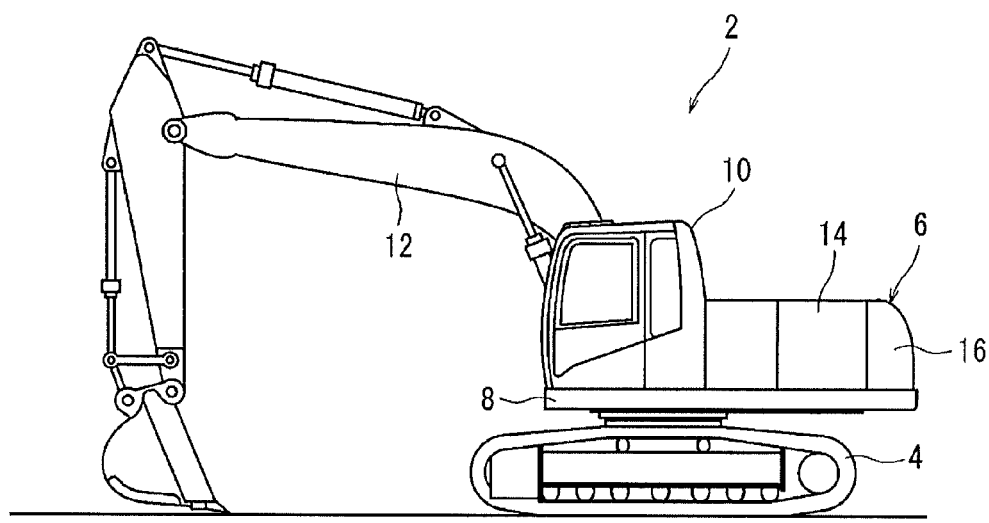
FIG. 5 is a side view of a hydraulic shovel as a construction machine including the cab support structure according to the present invention.

The hydraulic shovel will be described with reference to FIG. 5. A hydraulic shovel 2 includes a lower traveling body 4, and an upper slewing body 6 that is slewably fitted onto the lower traveling body 4. The upper slewing body 6 includes a cab 10 on a slewing frame 8 which is s a machine body frame, a working device 12 in front of the cab 10, an engine room 14 at the rear of the cab 10, and a counterweight 16 at rear end part of the cab 10.

Figure 1:
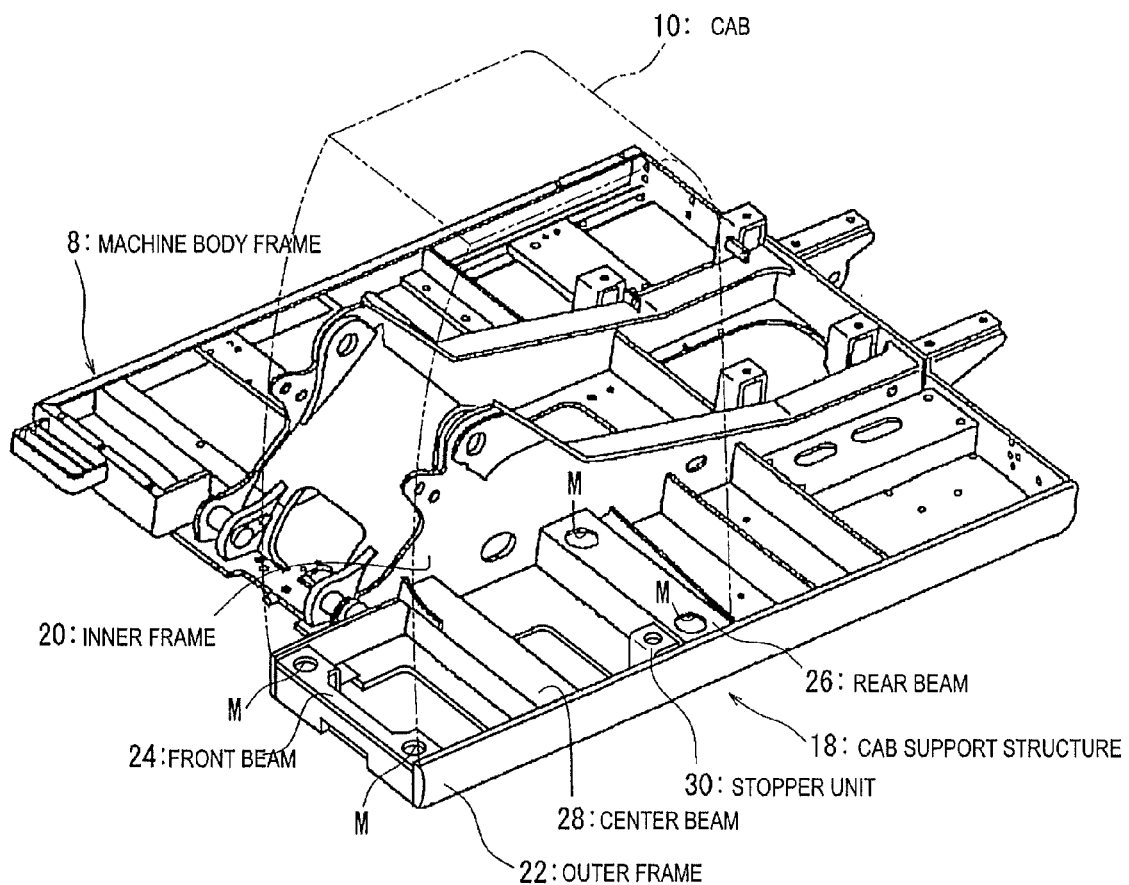
FIG. 1 is a perspective view of a slewing frame of a hydraulic shovel as a machine body frame that includes a cab support structure of a construction machine configured according to the present invention.
Figure 1:
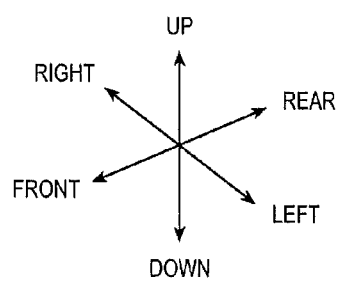

A cab support structure 18 that is provided in the machine body frame 8 will be described with reference to FIG. 1. The cab support structure 18 includes: a front beam 24 and a rear beam 26 that are respectively arranged by being welded and joined between an inner frame 20 and an outer frame 22 which extend in the front and rear direction of the slewing frame 8 with an interval therebetween, and that support a front and a rear of the cab 10 via anti-vibration mounts, and a center beam 28 which is positioned between the front beam 24 and the rear beam 26; and stopper units 30 of restriction members that are joined to the cab 10 to restrict movement of the cab 10 at the time of roll over of a machine body, the stopper units 30 being formed in a box structure, by being welded to and joined to the rear beam 26 and the outer frame 22 respectively, at corner parts at a side of the center beam 28 where the rear beam 26 and the outer frame 22 are in contact with each other.

The rear beam 26, the center beam 28, and the front beam 24 themselves may be known beams, except that the stopper units are not provided on the rear beam 26, which is a characteristic of the present invention, and each of them is formed by, for example, joining or bending a plate material in a channel shape or an angle shape, and is fitted with one side part thereof as an upper surface, and the other side part thereof as a side surface facing downward.

On the upper surface of each of the front beam 24 and the rear beam 26, two anti-vibration mount fitting holes M are provided at both end parts in a longitudinal left and right direction of the beam.

The restriction members of the anti-vibration mounts, and their fitting units may be known substances (JP '595, for example), and therefore, their descriptions and drawings will be omitted.

Figure 2:
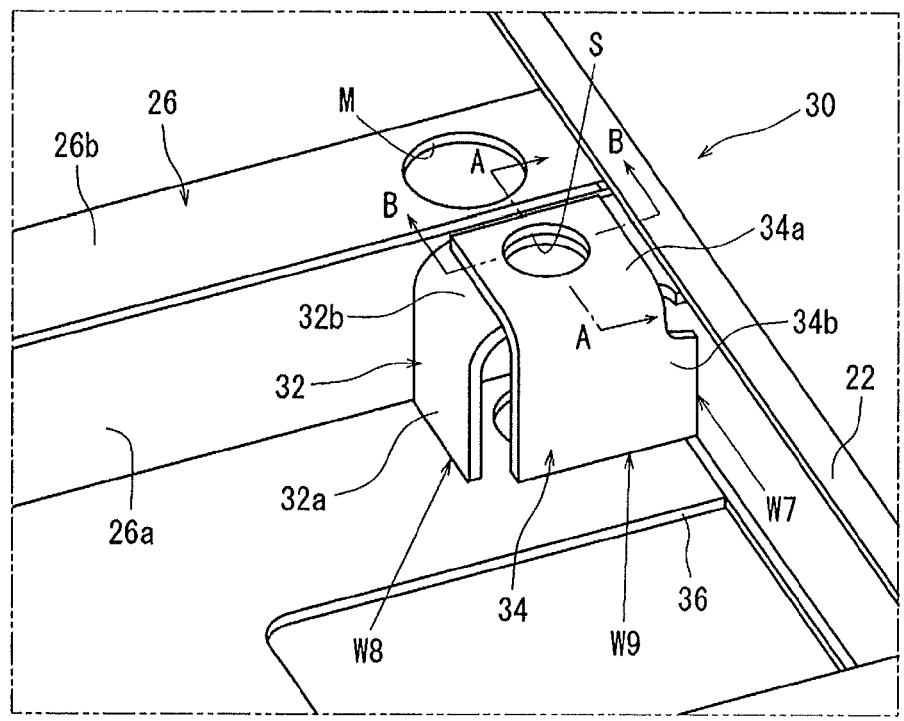
FIG. 2 is an enlarged detailed view of the stopper unit in FIG. 1.

The stopper units 30 will be described with reference to FIG. 2. Each stopper unit 30 includes an L-shaped plate 32, and a doubling plate 34 that reinforces the L-shaped plate 32.

The L-shaped plate 32 is provided by forming a band-shaped plate into an L shape, with one side thereof being set as a vertical side 32*a* directed downward, and the other side being set as an upper side 32*b* directed to the outer frame. At the corner part, an edge part on one side of each of the vertical and upper sides is welded to and joined to a side surface 26*a* of the rear beam 26, and a front end part of the upper side 32*b* is in contact with the outer frame 22.

The doubling plate 34 is obtained by forming a band-shaped plate into an L shape, with one side thereof being set as an upper side 34*a* which is superposed on the upper side 32*b* of the L-shaped plate 32 in an orthogonal direction, and with the other side being set as a vertical side 34*b* directed downward on a side separated from the rear beam 26. The upper side 34*a* is welded to and joined to the L-shaped plate 32, the rear beam 26, and the outer frame 22, respectively, and an edge part on one side of the vertical side 34*b* is welded to and joined to the outer frame 22.

On the upper side 32*b* of the L-plate 32 and on the upper side 34*a* of the doubling plate 34 that are superposed with each other, there is formed a pierced-through stopper bolt hole S of a smaller diameter than that of the anti-vibration mount fitting hole M.

The upper side 32*b* of the L-shaped plate 32 is positioned approximately in plane with an upper surface 26*b* of the rear beam 26. An upper end of the plate material that forms the side surface 26*a* of the rear beam 26 is positioned above the upper side 32*b* of the L-shaped plate 32 and the upper surface 26*b* of the rear beam 26 (FIG. 4(*a*)).

Figure 3:
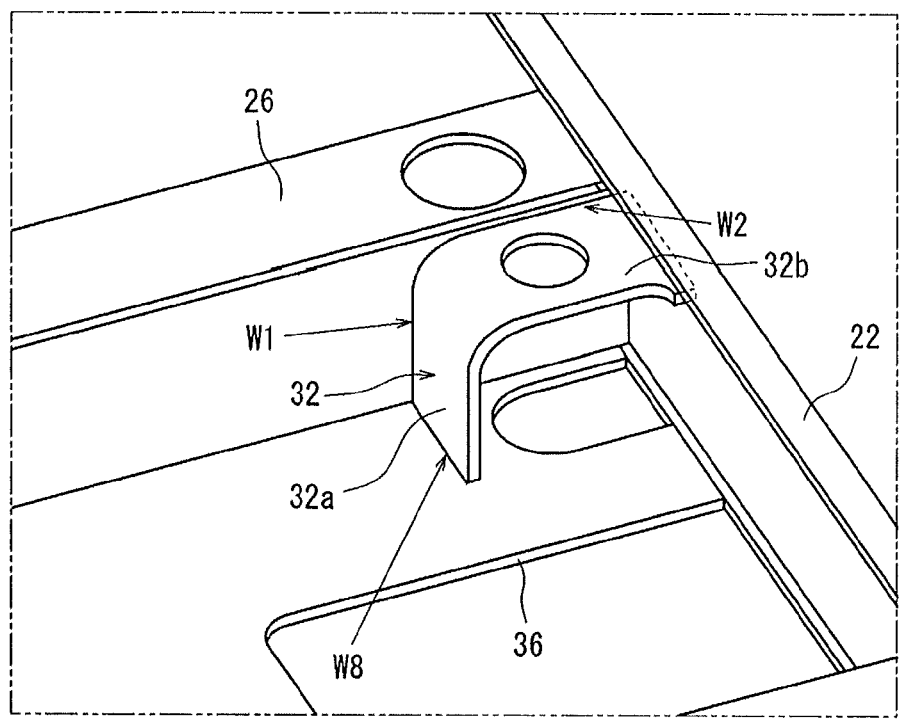
FIG. 3 is a view of the stopper unit in FIG. 2 excluding a doubling plate.
Figure 4:
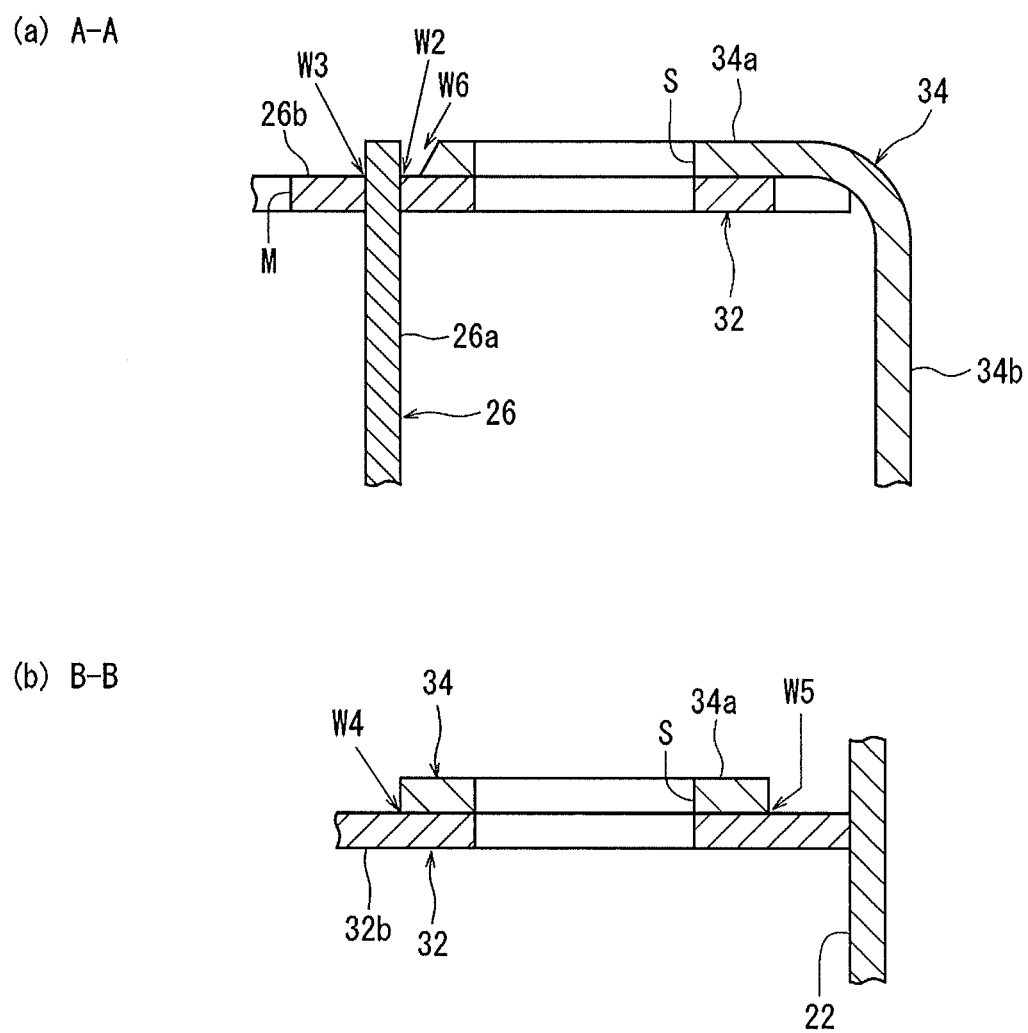
FIG. 4 (*a*) is an enlarged sectional view of the stopper unit in FIG. 2 in an arrow A-A direction, and FIG. 4 (*b*) is an enlarged sectional view of the stopper unit in FIG. 2 observed in an arrow B-B direction, in FIG. 2.

A detailed example of the welding of each stopper unit 30 will be described with reference to FIGS. 2, 3, and 4. The welding does not require inclining or inversion of the machine body frame 8, and the worker can perform the welding in a natural posture from above the machine body frame 8.

Descriptions will be made mainly with reference to FIG. 3. The L-shaped plate 32 has an edge part on one side respectively of the vertical side 32*a* and the upper side 32*b* joined to the side surface 26*a* of the rear beam 26, by continuous welding W1 and W2, and has a front end part of the upper side 32b that is in contact with the outer frame 22.

Descriptions will be made with reference to mainly FIGS. 2 and 4. The doubling plate 34 has both side edge parts of the upper side 34a joined to the upper side 32b of the L-shaped plate 32 by welding W4 and W5, has a front end part of the upper side 34a joined to the side surface 26a of the rear beam 26 by welding W6, and has an edge part on one side of the vertical side 34b joined to the outer frame 22 by welding W7.

Plate materials that form the side surface 26a and the upper surface 26b of the rear beam 26 are joined together by welding W3 at a portion opposite to the welding W2.

An end part of the vertical side 32a of the L-shaped plate 32 and an end part of the vertical side 34b of the doubling plate 34, that form an end part of each stopper unit 30, are joined by welding W8 and W9 onto the bottom. frame 36 that is joined to a lower part of the rear beam 26 of the machine body frame 8 and to a lower part of the outer frame 22.

The L-shaped plate 32 and the doubling plate 34 of the stopper unit 30 may be joined together in a sub-assembly state in advance, and then joined to a corner part of the rear beam 26 and the outer frame 22.

Further, the front end part of the L-shaped plate 32 that is in contact with the outer plate 22 may be joined by welding.

Depending on strength required for each stopper unit 30, a thickness of the plate material of the L-shaped plate 32, and the like, both-side welding may be provided by welding the inner side of an L-shaped edge part to the side surface 26a of the rear beam 26, in addition to the welding W1 and W2 of the edge parts at the outer sides of the vertical side 32a of the L-shaped plate 32 and the upper side 32b.

Working effects of the cab support structure 18 for a construction machine as described above will be described.

The cab support structure 18 includes: the front beam 24 and the rear beam 26 that are arranged between the inner frame 20 and the outer frame 22 of the machine body frame 8 and that support the front and the rear of the cab 10 via the anti-vibration mounts, and the center beam 28 which is positioned between the front beam 24 and the rear beam 26; and the stopper units 30 that restrict movement of the cab 10 at the time of roll over of the machine body, the stopper units 30 being formed in a box structure, by being welded to and joined to the rear beam 26 and the outer frame 22 respectively, at corner parts where the rear beam 26 and the outer frame 22 are in contact with each other.

The stopper units 30 that restrict movement of the cab 10 are provided in a box structure in which the stopper units 30 are joined not to the rear beam 26 which supports the cab 10 via the anti-vibration mounts but to the corner parts at which the rear beam 26 and the outer frame 22 are in contact with each other. Therefore, the rear beam 26 and the stopper units 30 can be formed in simple structures, can be welded easily with minimum welding distortion, and can be made light weight. Moreover, the quantity of high-strength and high unit-cost materials used can be reduced.

Because the stopper unit 30 of the box structure is joined to the rear beam 26 and the outer frame 22, the load applied to the stopper unit 30 can be supported by the rear beam 26 and the center beam 22. Local deformation can be suppressed, and a welding structure of the front beam 24 that supports the cab 10 can be simplified.

Welding of the stopper unit 30 that is joined to the rear beam 26 and the outer frame 22 does not require inclining or inversion of the machine body frame 8, and the worker can easily perform the welding in a natural posture from above the machine body frame 8.

The stopper unit 30 that is necessary when the cab 10 is in a roll-over protective structure (ROPS) specification can be set only in the case of the ROPS specification. Therefore, the machine body frame 8 can be commonized between the ROPS specification and the NON-ROPS specification.

Accordingly, manufacturing cost of the cab support structure 18 can be reduced.

Each stopper unit 30 includes: the L-shaped plate 32 which is obtained by forming a band-shaped plate into an L shape, with one side thereof being set as a vertical side 32a directed downward, and the other side being set as the upper side 32b directed to the outer frame 22, an edge part on one side of each of the vertical and upper sides being joined to the rear beam 26, and a front end part of the upper side 32b being positioned on the outer frame 22 side; and the doubling plate 34 that reinforces the L-shaped plate 32 and is obtained by forming a band-shaped plate into an L shape, with one side thereof being set as the upper side 34a which is superposed on the upper side 32b of the L-shaped plate 32 in an orthogonal direction and is joined to the L-shaped plate 32, the rear beam 26, and the outer frame 22 respectively, and with the other side being set as the vertical side 34b directed downward, an edge part on one side of the vertical side 34b being joined to the outer frame 22.

Therefore, in a simple structure having a small number of parts, there can be provided the stopper units 30 of a box structure that secures strength by simple welding. Further, a sub-welding process of the box structure can be omitted.

The lower end of each stopper unit 30 is joined to the bottom frame 36 that is joined to the lower parts of the rear beam 26 and the outer frame 22, of the machine body frame 8.

Therefore, the stopper units 30 can be set more firmly.

The present invention has been described in detail above based on the embodiment. However, the present invention is not limited to the embodiment, and can be variously modified and amended within a scope of the present invention, as described below, for example.

According to the embodiment of the present invention, the stopper units 30 are provided at corner parts of the side of the center beam 28 where the rear beam 26 and the outer frame 22 are in contact with each other. However, according to modes of the machine body frame 8 and the cab 10, and the like, the stopper units 30 may be provided at corner parts of the rear side where the rear beam 26 and the outer frame 22 are in contact with each other.

According to the embodiment of the present invention, the box structure of the stopper units 30 is formed by the L-shaped plate 32, and the L-shaped doubling plate 34 that is superposed on the L-shaped plate 32. However, the box structure may be formed by joining suitable plate materials. Alternatively, the stopper unis may be formed as the box structure by forging, casting, or the like.

EXPLANATION OF REFERENCE NUMERALS

2: hydraulic shovel (construction machine)
8: machine body frame
10: cab
18: cab support structure
20: inner frame
22: outer frame
24: front beam
26: rear beam
28: center beam 30: stopper unit
32: l-shaped plate
34: doubling plate
36: bottom plate

The invention claimed is:

1. A cab support structure of a construction machine, comprising:
a front beam and a rear beam that are respectively joined and arranged between an inner frame and an outer frame which extend in a front and rear direction of a machine body frame, and that support a front and a rear of a cab via anti-vibration mounts, and a center beam which is positioned between the front beam and the rear beam; and
stopper units of restriction members which are joined to the cab to restrict movement of the cab at the time of roll over of a machine body, the stopper units being joined to the rear beam and the outer frame respectively at corner parts where the rear beam and the outer frame are in contact with each other, and being formed in a box structure.

2. A construction machine including the cab support structure of claim 1.

3. The cab support structure of a construction machine according to claim 1, wherein
a lower end of each stopper unit is joined to a bottom frame which is joined to lower parts of the rear beam and the outer frame, of the machine body frame.

4. The cab support structure of a construction machine according to claim 1, wherein
each stopper unit includes:
an L-shaped plate which is obtained by forming a band-shaped plate into an L shape, with one side thereof being set as a vertical side directed downward, and the other side being set as an upper side directed to the outer frame, an edge part on one side of each of the vertical and upper sides being joined to the rear beam, and a front end part of the upper side being positioned on the outer frame side, at the corner part; and
a doubling plate that reinforces the L-shaped plate and is obtained by forming a band-shaped plate into an L shape, with one side thereof being set as an upper side which is superposed on the upper side of the L-shaped plate in an orthogonal direction and is joined to the L-shaped plate, the rear beam, and the outer frame respectively, and with the other side being set as a vertical side directed downward, an edge part on one side of the vertical side being joined to the outer frame.

5. The cab support structure of a construction machine according to claim 4, wherein
a lower end of each stopper unit is joined to a bottom frame which is joined to lower parts of the rear beam and the outer frame, of the machine body frame.

* * * * *